Feb. 20, 1923.

G. H. MULLER 1,445,791

MULTICYLINDER INTERNAL COMBUSTION MOTOR

Filed Dec. 15, 1919  2 sheets-sheet 1

Patented Feb. 20, 1923.

1,445,791

UNITED STATES PATENT OFFICE.

GEORGES HENRI MULLER, OF LYON, FRANCE.

MULTICYLINDER INTERNAL-COMBUSTION MOTOR.

Application filed December 15, 1919. Serial No. 344,952.

*To all whom it may concern:*

Be it known that I, GEORGES HENRI MULLER, residing at Lyon, France, have invented new and useful Improvements in or relating to Multicylinder Internal-Combustion Motors for which I have filed applications for patents in Germany, No. 64,538, December 21, 1918, and France No. 105,231, October 25, 1918, of which the following is a specification.

In internal combustion engines the air drawn is subsequently compressed by the piston to a pressure bringing it up to a temperature above that of ignition of the combustible liquid; at the required moment the combustible liquid is introduced and finely pulverized by the compressed air to a pressure above the maximum pressure developed in the cylinder. This air at a high pressure is usually obtained by means of a heavy and complicated compressor which takes the air at atmospheric pressure; the air, after compression, is subsequently cooled in coils or other cumbersome refrigerators to reduce it to a temperature at which it can be brought into contact with the combustible liquid without danger of ignition.

The object of the present invention is to obtain, in multi-cylinder internal combustion engines, the injection of air by means of a simple and light arrangement, this air being afterwards immediately utilized without cooling for the pulverization of the combustible liquid, in a suitable pulverizer where it will not come into contact with the combustible liquid until the precise moment of their simultaneous introduction into the combustion chamber, in the following manner:—

1. In each cylinder, at the end of compression, a small volume of compressed air is removed and isolated in a small cylinder adjacent to the engine cylinder, the cycle of which is slightly behind that of the cylinder from which the air has been removed.

2. This small volume of air is compressed by means of a piston mechanically operated, to a pressure above the maximum pressure of the indicator diagram of the engine cylinder; and this at the precise moment of its utilization and even during injection in such a manner that :—

(*a*) by reason of the immediate utilization of the air thus contained, the loss of heat and the loss of pressure will be as small as possible;

(*b*) the compression continuing even during the injection, the pressure of the injection air is maintained at a suitable height without having to resort to an intermediary reservoir to regulate it.

In the accompanying drawings, given merely by way of example :—

Figure 1:
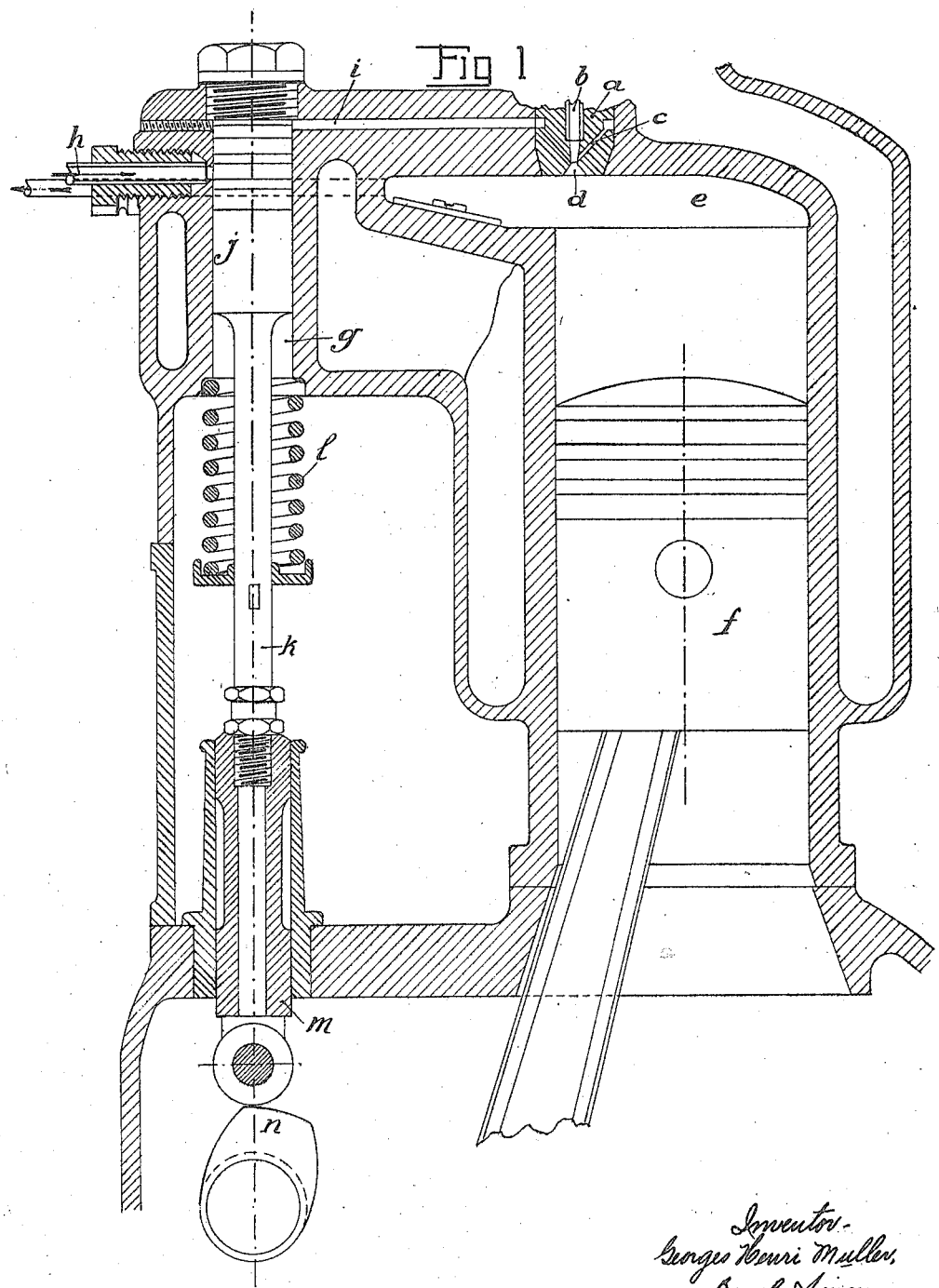
Fig. 1 shows a vertical longitudinal section of the upper part of one of the cylinders of a four cycle engine arranged according to the invention.

In the drawings (Fig. 1) $a$ is an injection block provided with a needle $b$ and having small conduits $c$ and an orifice $d$ opening into a combustion chamber $e$ of the cylinder containing the piston $f$ of the engine. A small auxiliary cylinder $g$ communicates with the compression chamber of the neighbouring cylinder by a pipe $h$ and with the injection block $a$ by a conduit $i$. A small piston $j$ is contained in the cylinder $g$ and the rod $k$ under the action of a coiled spring $l$ is lengthened by a guide piece $m$ actuated by a cam $n$ rotating at half the speed of the crank shaft and which can be affixed to the distributing shaft.

Figure 2:
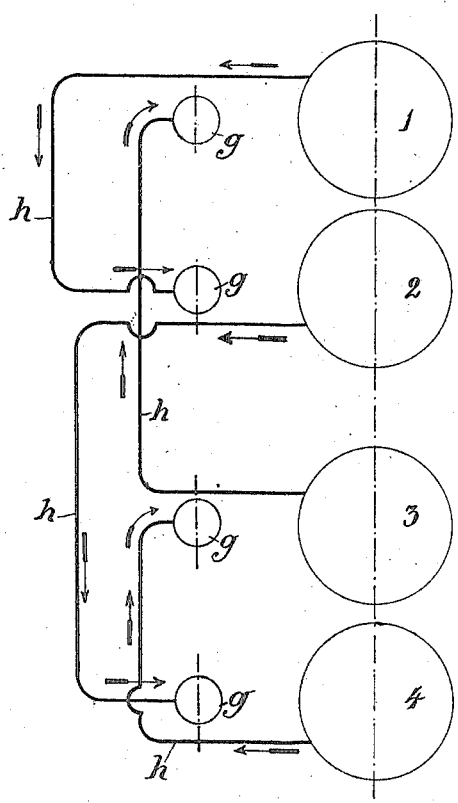
Fig. 2 is a diagrammatic plan of a four cycle engine having four cylinders.

On the other hand (Fig. 2) the order of ignition of the four cylinders of a four cycle engine is 3—1—2—4, and the small auxiliary cylinder of each engine cylinder is connected to the combustion chamber of the cylinder from which the compressed air is removed which it subsequently raises to the high injection pressure (the single line showing the connecting conduits or tubes).

The cylinders fire in the order 3—1—2—4, each a half revolution after the preceding one; considering first the cylinder 1, it will be seen that its small auxiliary cylinder $g$ communicates with the compression chamber of the cylinder 3 which fires immediately before, and the combustion chamber of the cylinder 1 communicates by a pipe with the small auxiliary cylinder of the cylinder 2 which fires immediately afterwards.

The suction and exhaust of the engine is obtained in any desired manner, and may be supposed to comprise a suction valve and an exhaust valve opening into the combustion chamber *e* as is usually the case in the majority of engines.

The cycle of operations in cylinder 1 for example is as follows:—

1st stage—suction.

The piston *f* descends, the suction valve is opened and the cylinder is filled with pure air at the atmospheric pressure. During this time, the small piston *j* is in its lower position. When the piston *f* reaches the bottom of its stroke, the piston of the cylinder 3 is at the top of its stroke (end of compression); the small auxiliary cylinder *g* in communication with the combustion chamber of the cylinder 3 is full of air at the same pressure as that in the combustion chamber (30 kilogrammes for example). At this moment under the action of the cam *n*, the piston *j* having commenced to rise, the orifice of the pipe *h* is closed, thus isolating above the latter and also in the conduit *i* and the annular chamber *i'* of the injector a suitable volume of air at a pressure of 30 kilogrammes.

2nd stage—compression.

The suction and exhaust valves are closed. The piston *f* rises, compressing the air drawn in thereby. During this time the small auxiliary piston *j* also rises being actuated by the cam *n* and compresses the air isolated above the piston *j* and originally at a pressure of 30 kilogrammes. It should be pointed out that the small auxiliary cylinder of the cylinder 2 communicating with the chamber *e* the cylinder 1, is filled with compressed air in the same way as the small auxiliary *g* of the cylinder 1, as described in the first stage.

3rd stage—combustion and firing.

When the piston *f* reaches a point shortly before the top of its stroke corresponding to the advance for firing, the air in the chamber *e* is at a pressure of 30 kilogrammes and at a higher temperature than the ignition temperature of the combustible liquid, the piston *j* is equally near to its top position but a little in advance; the air on which it acts is raised from a pressure of 30 kilogrammes to a temperature higher than that developed at the moment of combustion in the chamber *e* (60 kilogrammes for example).

At this moment either mechanically or under the action of the combustible liquid, driven by a pump, the needle *b* is raised, opening the passage for the combustible liquid contained under pressure in the chamber *a* and for the air at a pressure of 60 kilogrammes in the cylinder *g* and annular conduit *i*.

It produces a violent movement of air in the small conduits *c* and orifice *d* towards the chamber *e*. By reason of their arrival in front of the conduits *c* the particles of the combustible liquid are violently carried away by the air and are introduced with the latter into the chamber *e* in the form of a mist, the fine drops of which are exploded on contact with the air at a high temperature in the chamber *e*. The pressure of the latter reaches about 40 kilogrammes, but the pressure in the small cylinder *g* is maintained during this time above the latter as the piston *j* continues to ascend during the period of injection.

When the desired quantity of combustible liquid has been introduced, the needle *b* returns to its seating closing the passages for the combustible liquid and the injection air. The piston *f* which has then passed its highest point is forced down by the pressure of the burnt gases. During this time the small piston *j* is also making its return stroke.

4th stage—exhaust.

The exhaust valve open and the piston *f* in its rising stroke drives before it the burnt gases; the piston *j* remains at the bottom of its stroke until the cylinder *g* is again filled with compressed air from the cylinder 3, when it commences to compress the air and the cycle of operations commences over again.

It is only that the action should be clearly understood that it has been described with reference to a four cycle engine having four cylinders. The same action would take place in an engine having any number of cylinders, it being sufficient that the small auxiliary cylinder of each cylinder should be connected to the compression chamber of a convenient cylinder, generally to the compression chamber of the cylinder firing immediately before the one under consideration.

Further the auxiliary *j* should make its compression stroke between the end of the compression of the cylinder with which it communicates by the tube *h*, and the end of compression of the one into which it is drawn in.

In multiple cylinder engines where this time is very short, the small auxiliary cylinder *g* of each cylinder can be connected, not to the cylinder of which the cycle immediately precedes it, but to a cylinder the cycles of which is not so immediate.

It is not absolutely necessary that the engine should work on a four stroke cycle thus it could be adapted to an engine working on a two stroke cycle by driving the shaft of the cam *n* at the same speed as the crank shaft.

It is also evident that the manner of actuating the small piston *j* can be varied and that the cam and roller can be replaced by a crank, an eccentric, or other mechanism.

The arrangement of the injector shown on the drawings is only given by way of example, and other apparatus having the same object can be employed.

What I claim as my invention and desire to protect by Letters Patent is:—

An internal combustion motor comprising a plurality of main cylinders each having an injection element, a plurality of auxiliary cylinders, each connected by a conduit to the ejection element of one of the main cylinders, and by another conduit to the compression chamber of another of the main cylinders, a piston in each main cylinder, a piston in each auxiliary cylinder, and means for operating the auxiliary pistons at a lower rate of speed than that of the main pistons.

In testimony whereof I affix my signature in presence of two witnesses.

GEORGES HENRI MULLER.

Witnesses:
 LOUIS ESCHER,
 S. LAMBOROKE.